(12) United States Patent
Lambert et al.

(10) Patent No.: US 11,309,976 B2
(45) Date of Patent: Apr. 19, 2022

(54) ACOUSTIC DATA TRANSMISSION, TELEMETRY AND UNDERWATER COMMUNICATION SYSTEMS (71) Applicant: ION Geophysical Corporation, Houston, TX (US)

(72) Inventors: Dale J. Lambert, Mandeville, LA (US); Robert H. Kemp, Harahan, IL (US); Nicholas Muguira, Hammond, LA (US)

(73) Assignee: ION Geophysical Corporation, Houston, TX (US)

( * ) Notice: Subject to any disclaimer, the term of this patent is extended or adjusted under 35 U.S.C. 154(b) by 122 days.

(21) Appl. No.: 16/781,786

(22) Filed: Feb. 4, 2020

(65) Prior Publication Data
US 2020/0252138 A1 Aug. 6, 2020

Related U.S. Application Data (60) Provisional application No. 62/801,597, filed on Feb. 5, 2019.

(51) Int. Cl.
*H04B 11/00* (2006.01)
*H04B 13/02* (2006.01)
(Continued)

(52) U.S. Cl.
CPC .............. *H04B 11/00* (2013.01); *H04B 13/02* (2013.01); *H04L 27/20* (2013.01); *H04R 1/44* (2013.01)

(58) Field of Classification Search
CPC ......... H04B 11/00; H04B 13/02; H04L 27/20; H04L 5/0058; H04R 1/44
See application file for complete search history.

(56) References Cited

U.S. PATENT DOCUMENTS 3,909,773 A    9/1975 Saltzer
6,125,080 A *  9/2000 Sonnenschein ......... B63C 11/26
                                           367/134
(Continued)

FOREIGN PATENT DOCUMENTS

WO    95/14246 A1   5/1995
WO    9909683 A1    2/1999
(Continued)

OTHER PUBLICATIONS

Kilfoyle et al. "The State of the Art in underwater Acoustic Telemetry," IEEE Journal of Oceanic Engineering, vol. 25, No. 1, Jan. 2000, pp. 4-27.
(Continued)

*Primary Examiner* — Daniel Pihulic
(74) *Attorney, Agent, or Firm* — Patterson + Sheridan, LLP (57) ABSTRACT An acoustic communication and messaging system includes an acoustic transducer adapted for communicating signals via a subsurface acoustic medium, and a controller in communication with the acoustic transducer. The controller can include one or more of a signal programmer adapted for defining a limited set of coded signals; e.g., where each of the coded signals selected for low cross-correlation with other coded signals in the limited set, and a signal encoder adapted for defining a set of messages or commands; e.g., where each message is associated with a selected one of the coded signals in the limited set. The acoustic transducer can be adapted to transmit the coded signals associated with identified messages via the subsurface acoustic medium. An interface can be provided for identifying messages for coding and transmission, and for reporting decoded commands to a user.

18 Claims, 7 Drawing Sheets

(51) Int. Cl.
*H04R 1/44* (2006.01)
*H04L 27/20* (2006.01)

(56) References Cited

U.S. PATENT DOCUMENTS

| | | |
|---|---|---|
| 2004/0090865 A1 | 5/2004 | Davies et al. |
| 2004/0105344 A1* | 6/2004 | Davies ................. H04L 27/103 367/134 |
| 2004/0196183 A1* | 10/2004 | Roh ...................... G01S 19/246 342/357.25 |
| 2005/0120778 A1 | 6/2005 | Von Herzen et al. |
| 2005/0219950 A1* | 10/2005 | Rowe .................... G01S 5/0226 367/118 |
| 2005/0249036 A1 | 11/2005 | Davies et al. |
| 2009/0315777 A1 | 12/2009 | Baughman |
| 2011/0096632 A1* | 4/2011 | Pearce ................... H04B 11/00 367/131 |
| 2011/0317744 A1 | 12/2011 | Erickson |
| 2013/0038462 A1 | 2/2013 | Abdi |
| 2020/0252138 A1* | 8/2020 | Lambert ................. H04L 27/20 |

FOREIGN PATENT DOCUMENTS

| | | |
|---|---|---|
| WO | 00/02061 A1 | 1/2000 |
| WO | 02082696 A2 | 10/2002 |
| WO | 2004005954 A2 | 1/2004 |
| WO | WO-2020219143 A2 * | 10/2020 ............. H04B 11/00 |

OTHER PUBLICATIONS

PCT Notification of Transmittal of the International Search Report and the Written Opinon of the International Searching Authority, or the Declaration for Application No. PCT/US2020/016633 dated Nov. 20, 2020.

* cited by examiner

ACOUSTIC DATA TRANSMISSION, TELEMETRY AND UNDERWATER COMMUNICATION SYSTEMS

CROSS-REFERENCE TO RELATED APPLICATION

This application claims priority to U.S. Provisional Application No. 62/801,507, ACOUSTIC DATA TRANSMISSION, TELEMETRY AND UNDERWATER COMMUNICATION SYSTEMS, filed Feb. 5, 2019, which is incorporated by reference herein, in the entirety and for all purposes.

BACKGROUND

This disclosure relates to acoustic data transmission, acoustic telemetry, and underwater data communications. More generally, the disclosure relates to acoustic data transmission and acoustic telemetry systems for underwater communications, including, but not limited to, short message and command-based acoustic data transmission and telemetry systems adaptable for marine and underwater navigation.

Radio frequency (RF) and microwave bands have limited range in water media, restricting the use of traditional electromagnetic frequencies for underwater data communications. Low frequency and very low frequency (VLF) systems are known, but these technologies may be subject to substantial range, transceiver size, and bandwidth limitations.

Acoustic data transmission and underwater telemetry systems are also subject to range and bandwidth constraints. These are due, for example, to effects including multipath signal propagation and reverberation, Doppler spreading, signal reflection, refraction, fading, and absorption, as well as environmental noise. As a result there is a need for more advanced underwater data transmission systems, including acoustic data transmission, acoustic data communication and acoustic telemetry systems adaptable for underwater communications and marine navigation, with increased range and reliability.

SUMMARY

An acoustic data transmission system includes an acoustic transducer (or suitable transmitter and receiver devices), adapted for communicating acoustic messages in the form of encoded signals propagating through a marine environment, or other subsurface acoustic medium. An encoder (or encoder and decoder) device is provided in communication with the acoustic transducer, and a controller is provided in communication with the encoder. The encoder is adapted for encoding the messages in a format suitable for transmission through the acoustic medium, for example as a set of digitally encoded acoustic signals with relatively higher autocorrelation values and relatively lower cross correlation values.

The controller can be adapted for selecting the messages to be encoded from a set of messages and commands, which are associated with the coded signals. For example, the controller can be adapted to provide the signals to be encoded in the form of short data strings, which are mapped to a selected set of corresponding messages, commands and other desired communications. For example, the signal codes may comprise a limited set of signals selected from a population of available signals that is available, for a given (e.g., binary) signal length. The signals can be selected based on high auto-correlation values relative to cross-correlation values, as compared against other possible signals in the selected set.

DETAILED DESCRIPTION

Figure 1:
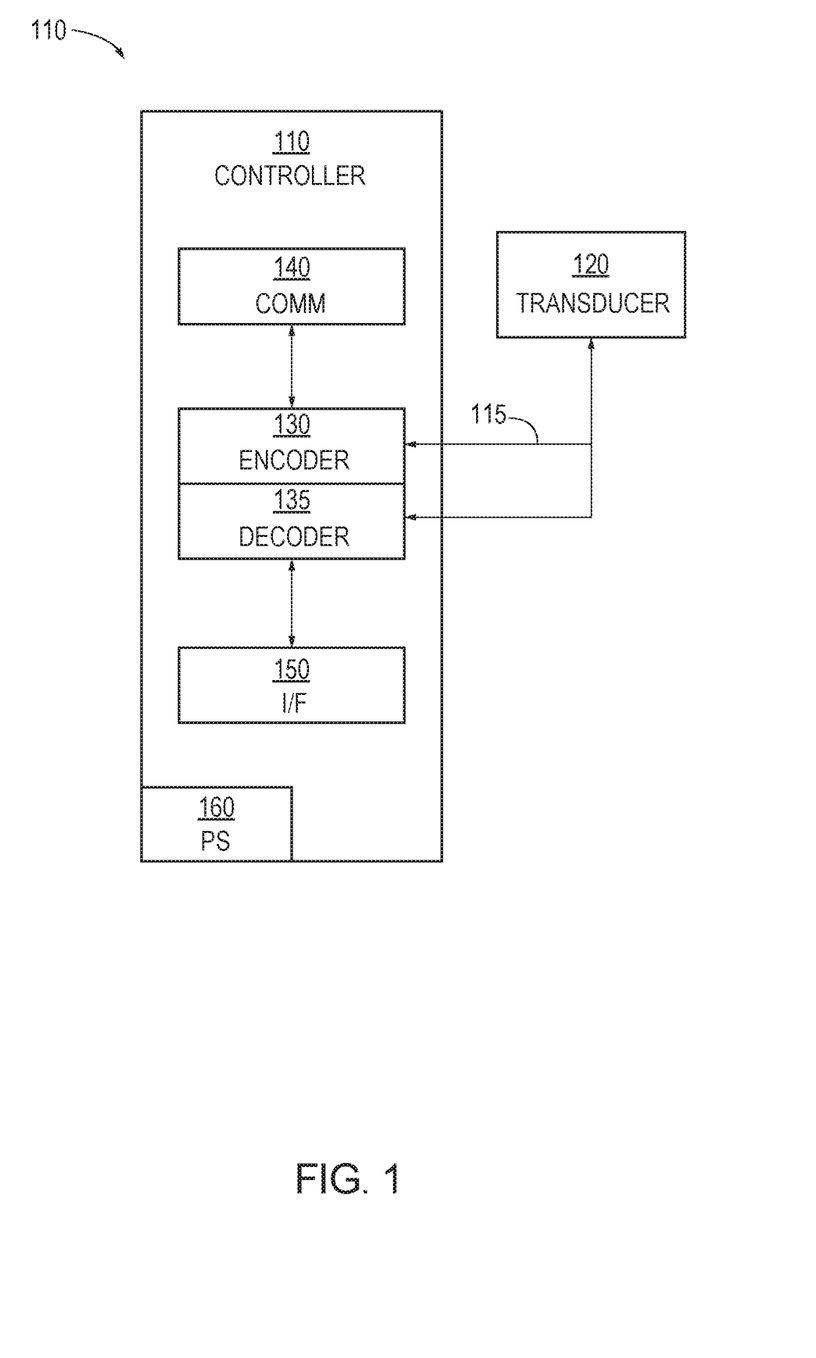
FIG. 1 is a block diagram of an acoustic data transmission system adaptable for acoustic telemetry and underwater data communications.

FIG. 1 is a block diagram of an acoustic data transmission system 100 adaptable for acoustic telemetry and underwater data communications. As shown in FIG. 1, system 100 includes one or more of a controller 110, acoustic transducer 120, signal encoder 130 and decoder 135, with a signal and communication programmer (COMM) 140 and user interface (I/F) 150. An internal or external power supply (PS) 160 can also be provided.

The controller 110 is in signal communication with the acoustic transducer 120, for example via one or more wired or wireless connections 115 to the encoder 130 or decoder 135, or both. The acoustic transducer 120 can be deployed in communication with a body of water or other acoustic medium, and adapted to transmit and receive acoustic signals, for example in the form of coded, low-correlation acoustic signal sequences. Alternatively, an acoustic transponder or transceiver 120 can be used, or other acoustic signal transmit and receive hardware components 120.

In operation of system 100, the communication programmer 140 can define a limited set of coded signals for association with various short messages or command communications (or other transmitted data), with low cross-correlation to improve transmission accuracy. The coded signals can also be selected for reduced sequence length, in order to lower the overall acoustic signature of the transducer 120. Accordingly, system 100 can operate by selecting fewer, shorter, and more distinguishable coded signals, increasing transmission accuracy while reducing the number and duration of individual transmissions.

For example, each coded signal can be defined as a binary sequence. In some examples, $2^N+1$ binary sequences are defined in the set of coded transmission, where N is a positive integer and each of the binary sequences has a period of $2^N-1$. An absolute cross-correlation between any two of the coded signals may be less than or equal to $2^{(N+2)/2}$, for example in a Gold code or other limited cross-correlated embodiment, as described herein.

Suitable length and coding parameters N may be selected based on application, for example N may be ten or less, yielding 1025 or fewer distinct binary sequence coded signals in the selected set, or ten or more, more yielding more than 1025 codes. Alternatively N may be nine or less or eight or less, for example yielding 257 or fewer distinct code sequences, or seven or less or six or less, for example yielding 65 or fewer coded signals. Hexadecimal, octal, and other signal codes can also be used. Signals may also be grouped into larger messages including many signals that are received and decoded as a single transmission or in a coherent sequence of coded signals, or in an asynchronous sequence.

The encoder 130 includes electronic components adapted for the acoustic transducer 120 to transmit coded signals associated with selected short messages, commands and other communications, for example by modulating the phase of an acoustic carrier frequency propagating through the acoustic medium. In some embodiments, the encoder 130 and transducer 120 generate the coded acoustic signals using phase shift keying (PSK), binary phase shift keying (BPSK), differential phase shift keying (DPSK), or a combination thereof.

The acoustic transducer 120 can also be adapted for receiving signals from the acoustic medium, and for communicating the signals with the controller 110 via electronic components in decoder 135. If one of a limited set of predefined coded signals is received, for example, the controller 110 can be adapted to identify a message or command associated with the received coded signal, using one or both of the signal encoder 130 and decoder 135, and the communication programmer 140.

The interface 150 is adapted for identifying messages for coding and transmission, and for reporting decoded commands. For example, interface 150 may include a visual display, touch screen, or similar graphical interface adapted for a user to enter selected command for transmission, and to display decoded signals that are received. In some examples, the interface 150 may also include a wired or short-range wireless link to a diver, crewmember or other user; e.g., on a diver propulsion device (DPD) or diver propulsion vessel (DPV), or on a crewed or uncrewed (autonomous) surface or submersible vessel.

Figure 2A:
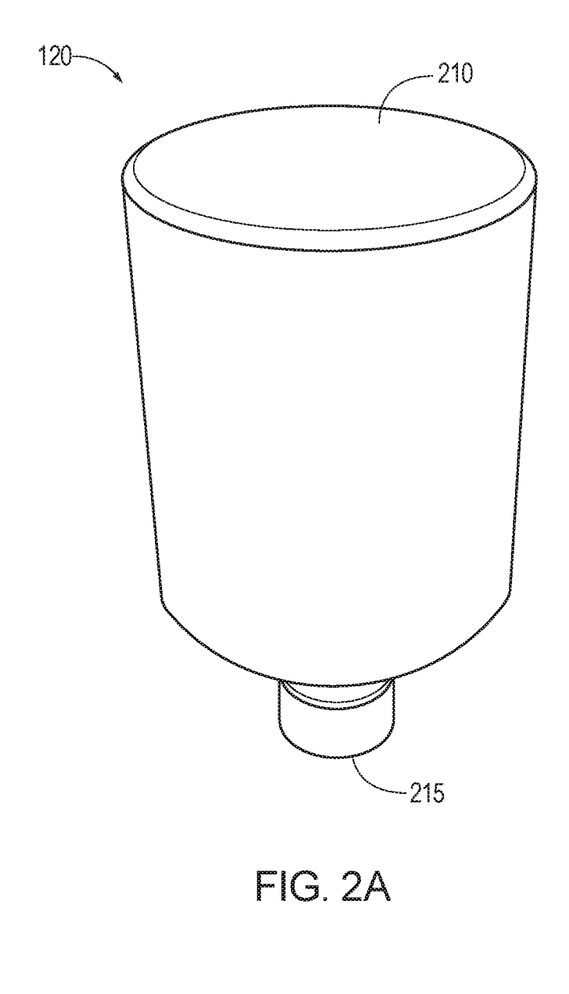
FIG. 2A is top perspective view of an acoustic transducer for an acoustic data transmission system, in a particular embodiment.
Figure 2B:
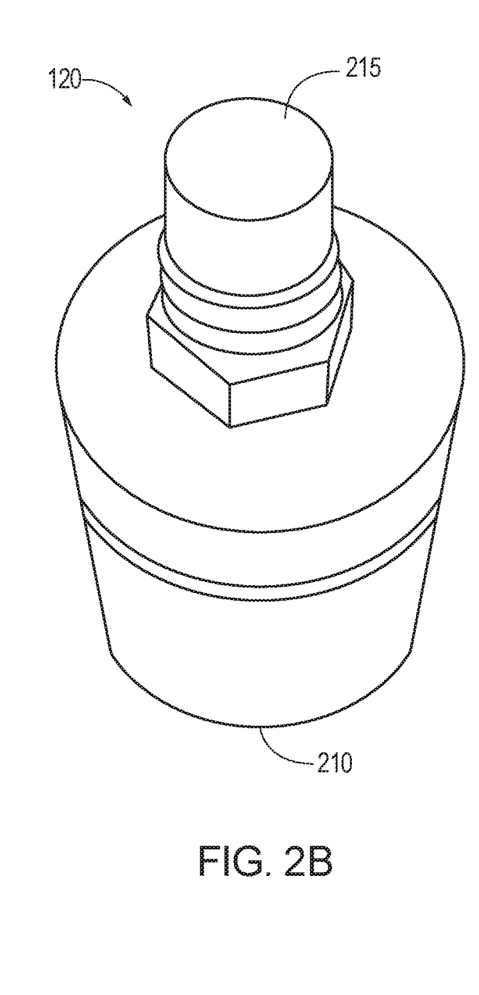
FIG. 2B is a bottom perspective view of an acoustic transducer.

FIG. 2A is top perspective view of an acoustic transducer 120 for an acoustic data transmission system 100. FIG. 2B is a bottom perspective view of an acoustic transducer 120. As shown in FIGS. 2A and 2B, transducer 120 includes a generally cylindrical body or housing 210 and a coupling or electrical connector 215; e.g. for coupling the transducer 120 to the controller 110 of an acoustic data transmission system 100, as shown in FIG. 1.

More generally, transducer 120 may include any one or more suitable acoustic transceivers, transponders, or other acoustic-frequency transmit and receive devices disposed with housing 210. For example, a suitable toroidal or frustoconical emitter/receiver body may be disposed within the housing 210, and coupled to an external connector 215 adapted for connecting the acoustic transducer 120 to the controller 110. Multiple other designs are also contemplated, and the transponder configuration is not limited except as expressly claimed.

Housing 210 is adapted for acoustic coupling between the transducer device and the surrounding water medium. For example, housing 210 may have an acoustic impedance matching that of the surrounding water column or other acoustic medium, or housing 210 may be acoustically transparent. Connector 215 is adapted to provide a waterproof and pressure-resistant electronic coupling between the internal components of the transducer 120 and the electronics board or controller 110.

The connector or coupling 215 can be used to pair each controller 110 with a dedicated acoustic transducer 120, or to select among different acoustic transducers 120 based on operating frequency, power, range, and beam shape. For example, the connector 215 can be used to select among modular acoustic transducers with a horizontal or vertical directionality, a planar or omnidirectional (360°) output, or a focused, conical output beam.

The examples of FIGS. 2A and 2B are merely representative, and many other suitable designs are available. Depending on embodiment, the transducer geometry may be substantially different, as reflected in the corresponding size and shape of the transducer housing 210, and connector 215 can take a variety of forms. A multi-mode acoustic transducer 120 can also be provided, or a multiple-transducer array with a number of individual transducers 120.

Figure 3:
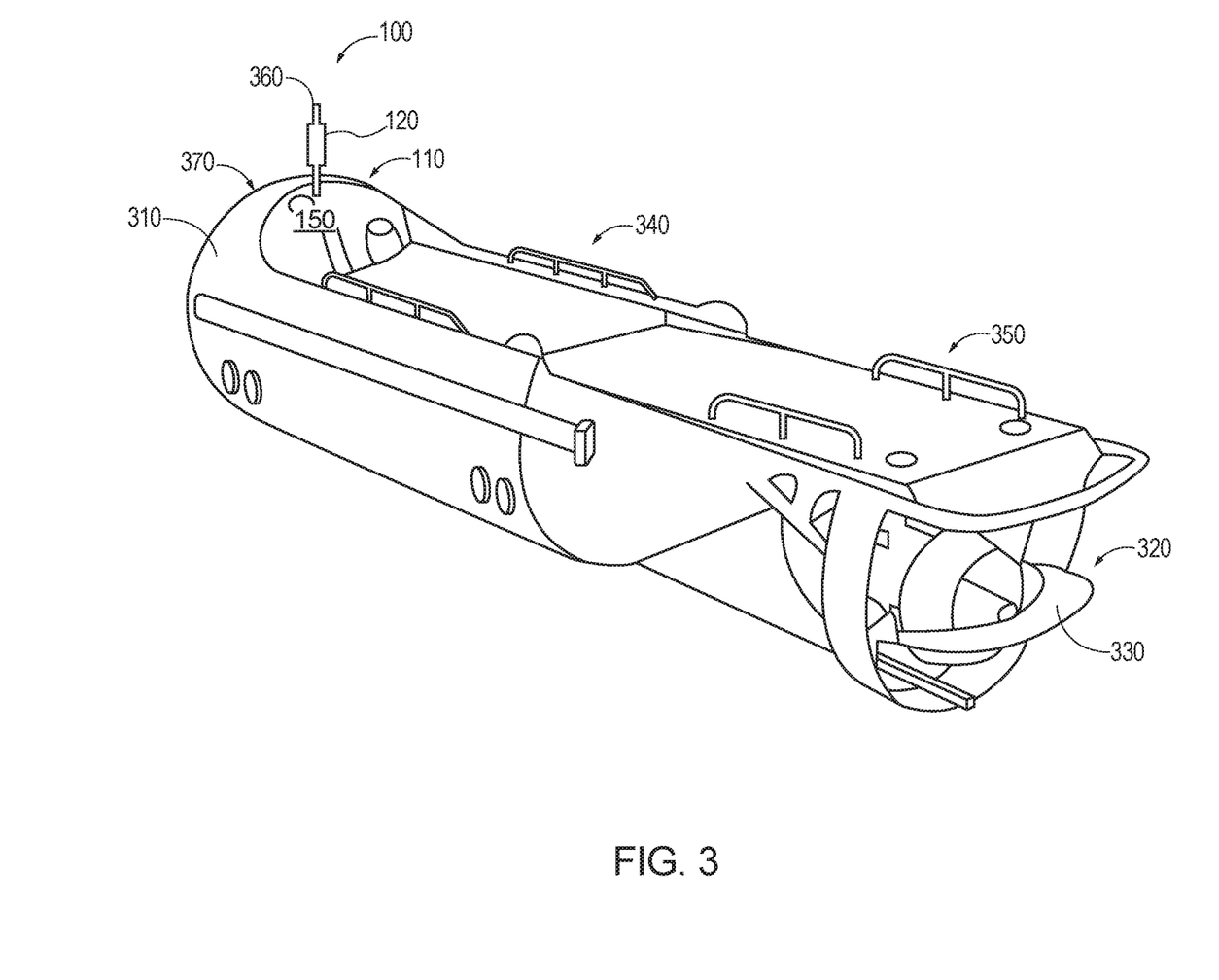
FIG. 3 is a schematic diagram illustrating an acoustic data transmission system adaptable for acoustic telemetry and underwater communications, deployed on a submersible vehicle, vessel, or propulsion unit.

Suitable acoustic transducers 120 can operate at selected or specified carrier frequencies with a bandwidth of about 10-30 kHz. The carrier frequency can be selected based on suitability for a particular application, and may typically fall between about 10-120 kHz. Alternatively, suitable transducers 120 may operate in higher carrier frequency ranges, for example up to about 1 MHz, or up to about 2 MHz or more. In this context, the term acoustic may refer to the operating range of the transducer 120, rather than to any particular anthropocentric or human-hearing based audible range. In additional embodiments, suitable carrier frequencies may range from about 1-5 kHz or less up to 30-40 kHz or more, for example from about 5-15 kHz, or from about 30-35 kHz or about 35-40 KHz. Additional transducers 120 may operate at up carrier frequencies up to 200 kHz or more, for example around 190-210 kHz. FIG. 3 is a schematic diagram illustrating an acoustic data transmission system 100 adaptable for acoustic telemetry and underwater communications, deployed on a submersible vehicle, vessel or propulsion unit 300. As shown in FIG. 3, the vessel or vehicle 300 includes a hull 310, propulsion system 320 and steering mechanism 330.

In driver propulsion device (DPD) or driver propulsion vehicle (DPV) embodiments, the forward compartment 340 and aft area or back deck 350 of the vessel or vehicle (or other submersible craft) 300 can be adapted to accommodate one or more divers or other operators, and related equipment. In other applications, the submersible craft 300 may be configured as smaller, hand-held propulsion device or propulsion unit, or an unmanned (uncrewed) or autonomous underwater vessel or vehicle (AUV).

Acoustic data transmission system 100 includes an acoustic transducer 120 and controller 110, for example with an interactive screen-based user interface 150, as described herein. The controller 110 is provided with a combination of custom hardware, software and firmware to control the acoustic transducer 120, and to operate system 100 for underwater acoustic telemetry and communications. The interface 150 is adapted for selecting short messages and commands (or other communications) for encoding and transmission by the acoustic transducer 120, and for displaying messages received by the transducer 120 and decoded by the controller 110.

For example, the acoustic transducer 120 can be deployed on a mast or other mount 360, with the controller 110 and interface 150 in the forward area or cockpit 340 of the submersible craft 300; e.g. proximate the vessel or vehicle control system 370. Alternatively, one or both of the controller 110 and interface 150 can integrated with the vessel control system 370, and the acoustic transducer 120 may be mounted in the hull 310.

Figure 4:
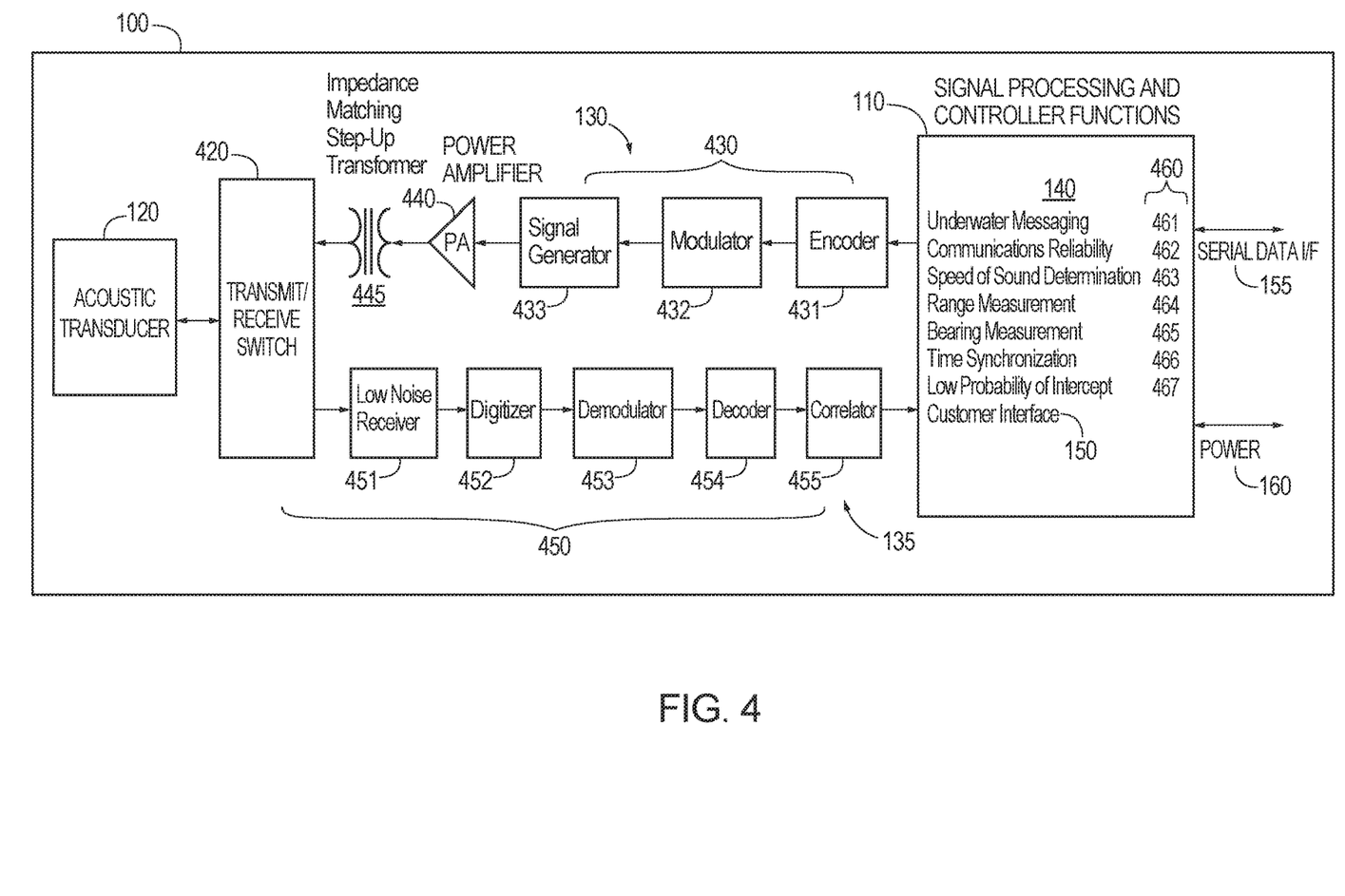
FIG. 4 is a schematic diagram of the acoustic data transmission system, illustrating selected components.

FIG. 4 is a schematic diagram of the acoustic data transmission system 100, illustrating selected internal components. The elements of system 100 as shown in FIG. 4 can be used alone, or in combination with any of the elements of system 100 as shown in FIG. 1 (above), and in FIG. 5 (below).

In the particular example of FIG. 4, system 100 includes an acoustic transducer 120 coupled to a transmit/receive switch 420, a signal generator or encoder 130 including signal side electronics 430 with an encoder 431, modulator 432 and signal generator 433. The signal generator 433 can be connected to the transmit/receive switch 420 via a power amplifier 440 and a transformer 445, for example an impedance matching step-up transformer.

The signal decoder 135 includes receiver electronics 450 disposed in signal communication with the transmit/receive switch 420. Suitable receiver components 450 can include one or more of a low-noise receiver 451, digitizer 452, demodulator 453, decoder 454, and correlator 455.

The controller 110 includes a programmer 140 for defining the message and command communication set. The programmer 140 can also incorporate hardware, firmware and software logic adapted to perform one or more additional functions of a method 460 including, but not limited to: selecting underwater messaging for communication (461); error checking and correction, redundancy, and other functions for communications reliability (462); speed of sound determination (463); range measurements (464) and bearing measurements (465) for a detected signal; time synchronization (466) for data communications; and probability (e.g., relatively low probability) of intercept determination (467), for data communications with one or more systems 100 adapted for navigating in, on or through a water column or other acoustic medium. These procedures can also be performed by an acoustic data transmission system 100 in combination with one or more process steps according to method 560 of FIG. 5 and method 700 of FIG. 7, as described below.

The customer interface or user interface 150 can include a graphical user interface with interactive user display. An external serial or parallel data interface 155 can also be provided; e.g., for communications with the vessel, vehicle, or propulsion unit on which the system 100 is deployed, or for other external communications.

Figure 5:
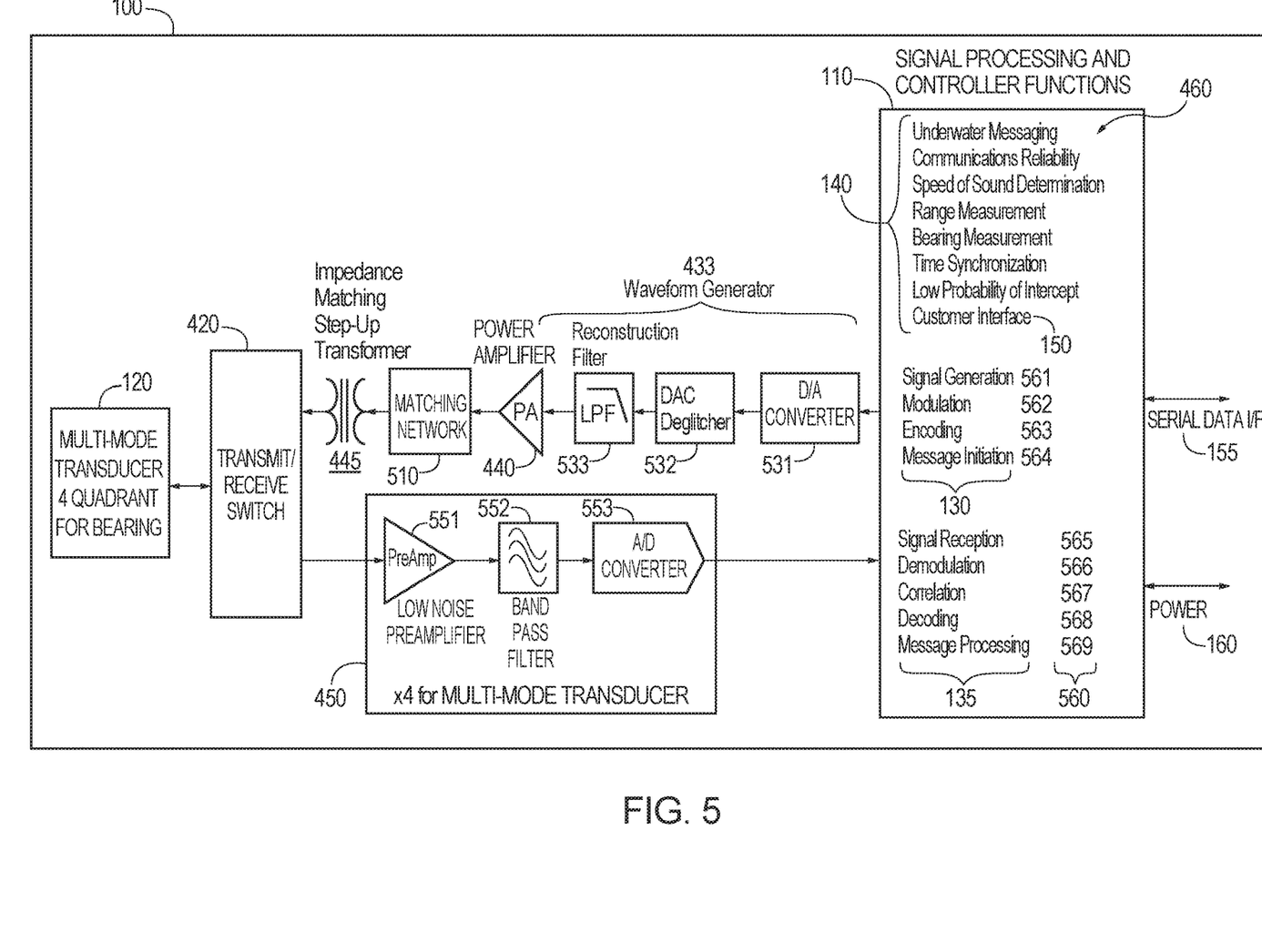
FIG. 5 is an alternate schematic diagram of the acoustic data transmission system, showing additional components that support detecting a bearing from a received signal.

FIG. 5 is an alternate schematic diagram of the acoustic data transmission system 100, showing additional components. The elements of system 100 as shown in FIG. 5 can be used alone, or in combination with any of the elements of system 100 as shown in FIG. 1 and FIG. 4, above.

In the particular example of FIG. 5, system 100 includes a multi-mode acoustic transducer 120; e.g., with four-quadrant functionality for bearing determination. The power amplifier 440 is connected to the transmit/receive switch 420 via a matching network 510 and transformer 445.

On the transmit side, the waveform generator (or signal generator) 433 can include one or more of a digital/analog (D/A) converter or DAC 531, a DAC deglitcher 532, and a reconstruction filter 533, for example a low-pass filter (LPR), or a high-pass filter (HPF) or narrow pass (band pass) filter, depending on embodiment. The receiver electronics 450 can also include a low-noise preamplifier 551, a band-pass filter 552, and an analog/digital (A/D) converter 553.

On the transmit side, the controller 110 or signal encoder 130 logic can also be adapted to perform one or more additional processes of a method 560 including, but not limited to: signal generation (561), modulation (562), encoding (563), and message initiation (564). On the receive side, the controller 110 or decoder logic 135 can be adapted to perform one or more additional processes of method 560 including, but not limited to, signal reception (565), demodulation (566), correlation (567), decoding (568), and message processing (569). These procedures can be performed by the acoustic data transmission system 100 in any order or combination, with or without one or more process steps according to method 460 of FIG. 4 (above), and method 700 of FIG. 7 (below).

Figure 6:
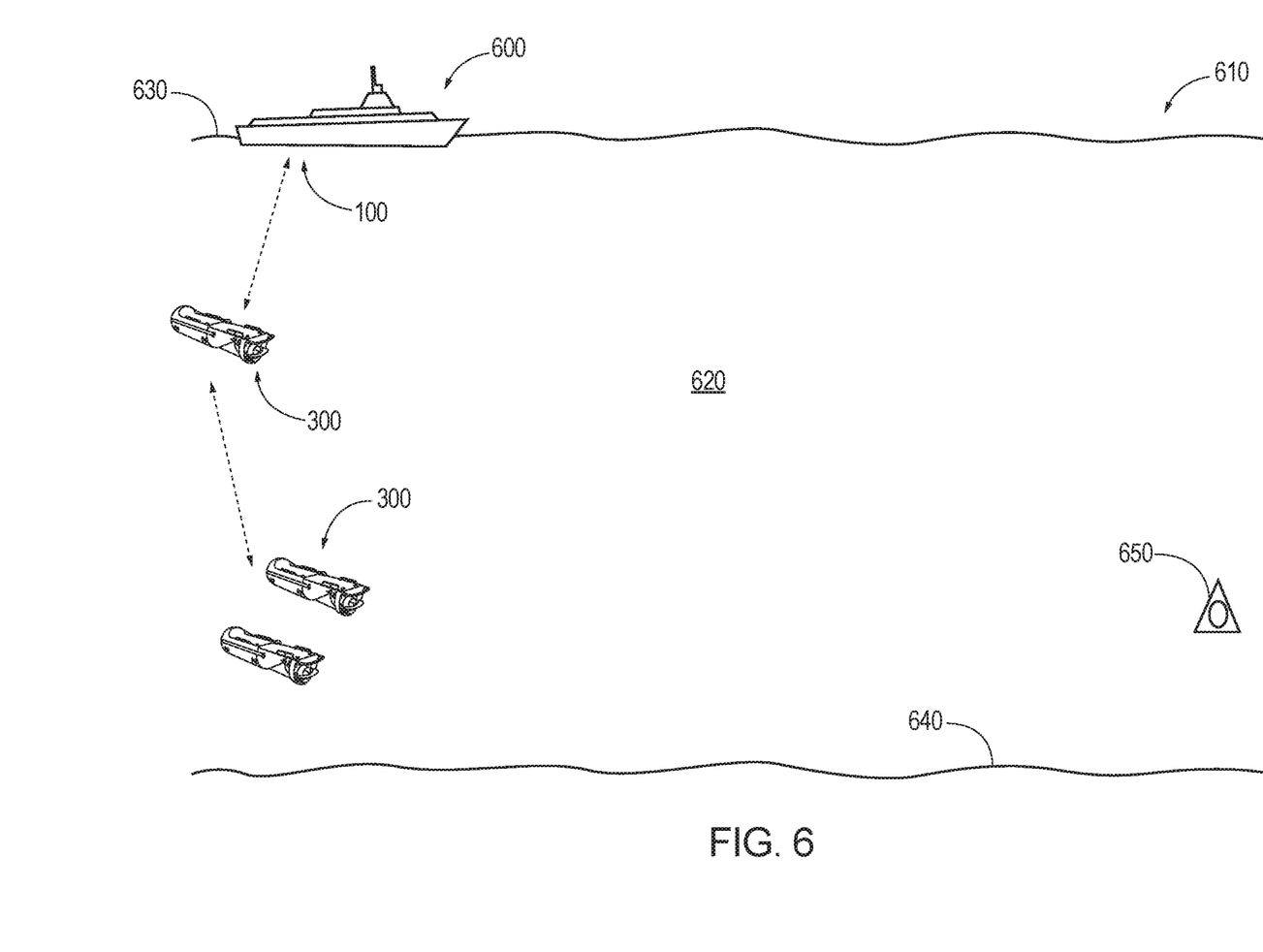
FIG. 6 is a schematic diagram illustrating deployment of an acoustic telemetry and data transmission system on one or more surface vessels and submersible craft.

FIG. 6 is a schematic diagram illustrating a number of acoustic telemetry and underwater communication systems 100 deployed on one or more surface vessels 600 and/or submersible vessels or vehicles 300, in a representative deployment or distributed apparatus 610. As shown FIG. 6, an acoustic transmission system 100 is deployed on a vessel 600 operating in an ocean, sea, lake, river, harbor, or other body of water 620, for example on the top surface 630 of the water body or water column 620. Acoustic transmission systems 100 can also be deployed on one or more submersible craft 300; e.g., disposed on or between the top surface 630 and bottom surface 640.

Acoustic transmission systems 100 are adapted for acoustic telemetry and underwater communications between the surface vessel 600 and submersible craft 300, and among the different submersible craft 300. Systems 100 use a selected set of coded signals to communicate data, for example with relatively high auto-correlation values relative to relatively lower cross-correlation values. This distinguishes from other acoustic transducer, acoustic transceiver, acoustic transponder and acoustic modem technologies where analog communications or more generic digital signals are used, and where either the range or reliability (or both) may be substantially less. By using transmissions from a more limited-set of coded signals that exhibit low cross correlation, both range and reliability can be increased, with better message compression to reduce the overall noise footprint. The signals are encoded to allow for asynchronous operation of the transmission system, with non-coherent signal detection.

Acoustic data transmission systems 100 are suitable for diver propulsion devices and other manned or crewed submersible vessels operating near the shore, or in relatively shallow water up to about 100 m. The disclosed acoustic transmission systems 100, however, are not necessarily depth limited. In other applications, suitable systems 100 can be adapted for underwater navigation on submersible vessels operating at greater depth, including both crewed and uncrewed (unmanned) robotic and autonomous vessel applications operating at depths of up to 1 km or more. Depending on transducer design, systems 100 may also be adapted to operate in the deepest ocean regions, at depths of up to 10 km or more.

The range for reliable acoustic transmissions can be determined not only by signal strength and carrier frequency, but also by subsurface geography and environmental noise, as well as thermoclines and other inhomogeneity in the acoustic medium. Depending on application, therefore, the operational range of system 100 may be about 500 m or more, for example up to about 1 km. In other examples the operational range may be greater, depending on local geography, water temperature, density, environmental noise, and other considerations, for example 1 km or more.

In some of these examples, systems 100 are used for underwater communication and navigation between a surface vessel 600 and one or more submersible vessels or vehicles 300 engaging with a particular target 650, or during navigation from a surface vessel 600 or other location to a selected destination 650. More generally, any suitable messages or other data can be communicated, including, but not limited to, the representative short messages, commands, requests, telemetry, and other data transmissions in Table 1.

TABLE 1

Representative Messages, Commands & Telemetry

| Command | Signal Ref |
|---|---|
| Alpha | C-0 |
| Report | C-7 |
| Target | C-8 |
| Search/Identify | C-E |
| Engage | C-A |
| Retrieve | C-F |
| Hold | C-1 |
| Return | C-6 |
| Silent | C-4 |
| Contact | C-5 |
| Recode | C-9 |
| Step | C-B |
| Delta | C-D |
| Data [+] | C-2 [+] |
| Vector/Bearing [+] | C-3 [+] |
| Depth [+] | C-C [+] |
| Ping | C-[X] |
| ID | C-[Y] |
| . . . | . . . |
| Omega | C-[$2^N$+1] |

As shown in Table 1, short messages or commands (e.g., "Alpha," "Report," "Target," "Search" or "Identify," "Engage," "Retrieve," "Hold," "Return," "Silent," "Contact," . . . "Omega") can be associated with individual signal codes, in order to provide a user-specific set of compressed messages and command codes with meanings adapted for a particular mission, target, destination or task. Depending on application, the code assignments may be randomly selected, or based on a predetermined, agreed-upon order or sequencing, based on a particular mission or task. Additional messages and commands can be defined to have any suitable meaning, not limited to the above commands in Table 1, and coded signals are not length limited.

Short messages and communications can also be used to redefine the signal code mapping (e.g., "Recode"), so that some or all of the messages and commands are associated with different coded signals. In these examples, at least one or up to all of the messages or commands can be associated with a different one of the coded signals, which was not previously associated with the recoded communication. Recoding can be performed prior to a particular mission, for example on a mission-by-mission basis, or during a mission, for example on a task-by-task basis.

The recoded command assignments can be based on a predetermined, agreed-upon coding arrangement, or by stepping through a particular coding sequence (e.g., "Step"). In addition, recoding can also be performed to reduce the capability of other parties to intercept and decode commands, or to otherwise interfere with communications. Recoding and step-type commands can also be used to select or change the carrier frequency (e.g., "Delta," etc.), for example by stepping through or selecting from a set of available bands to improve range, reduce environmental noise, or avoid detection.

Recoding can also be performed to introduce new messages or commands, in order to increase the number of communications available for use with a given limited set of coded signals. In these examples, at least one new message or command can be associated with any one or more of the predefined coded signals, where the new command was not previously defined in the set of messages and commands, or not previously associated with any of the coded signals. Thus, new commands can be introduced in real-time during a mission, or in navigating to a particular target or destination, depending on the tasks at hand.

Alternatively, the signal coding can be selected in real time, using sequence of coded signals to identify a desired mapping of messages and commands to coded signals. Similarly, additional codes (e.g., "Data," "Vector," or "Bearing," "Depth," etc.) can be used to flag code sequences for other data or information transfer. For example a sequence of one, two, three or more additional coded signals can be used to transmit navigational data, telemetry, or other information regarding a particular target or destination. These data can be transmitted in raw binary, octal, hexadecimal, or decimal form, independent of the message and command assignments.

In particular examples, suitable telemetry may include bearing and depth information provided by the acoustic transmission system, for example using a depth sensor, gimbaled compass or other sensor devices in the acoustic transducer, or in the vessel on which the system is mounted or deployed. A GPS system can also be provided in either the acoustic transmission system or the host vessel (or both), in order to determine or verify navigational information when the vessel is on the surface or at a suitable depth for deploying a mast.

Thus, both asynchronous and variable-length transmissions may be used. Additional codes (e.g., "Ping," "ID," etc.) can be assigned to individual operators or transmission systems 100, so that each has a unique transmission or response code (or both). Error checking, error correction, encryption, and redundant signal transmissions can also be applied to improve reliability (e.g., pairing or otherwise repeating transmissions of a particular signal, and cross-checking the correlated results for each individual transmission). Depending on application, these techniques can be used to substantially reduce the false positive rate, or to accommodate a limited false negative rate, or other signal loss mechanism.

In some embodiments, the system can be adapted to automatically transmit one signal in response to reception of another, for example to relay a signal to other users or systems, or to automatically respond to a given message such as a Ping or ID request. Similarly, the system 100 can be adapted to automatically provide telemetry in response to a Data request or Vector (navigational) message, in the event of a Recode or Step command indicating a change in the coded signal assignments, or in response to a Delta or other request to change the acoustic carrier frequency.

Figure 7:
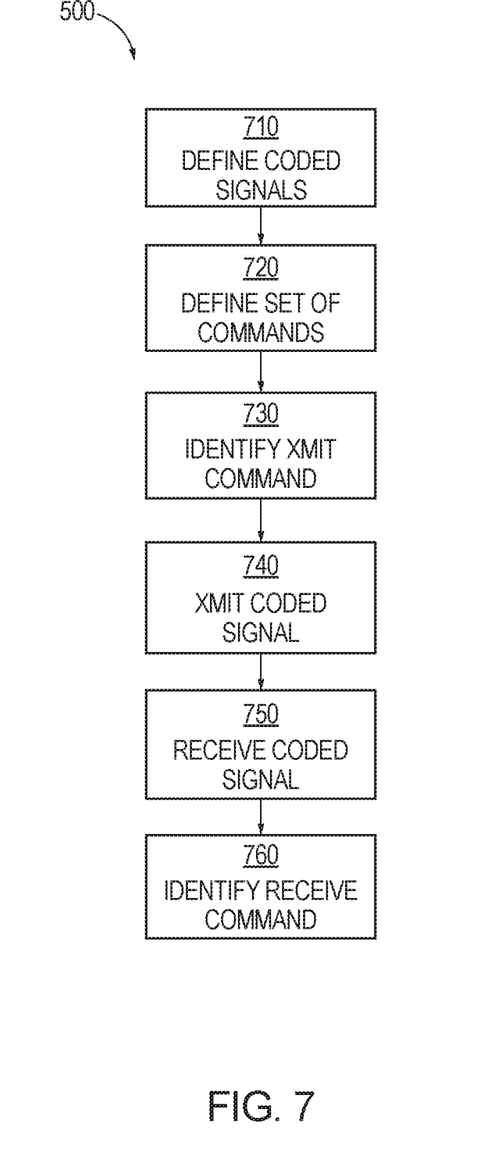
FIG. 7 is a block diagram illustrating a method for acoustic telemetry and underwater communications.

FIG. 7 is a block diagram illustrating a method 700 for acoustic telemetry and underwater communications. As shown in FIG. 7, method 700 includes one or more processes of: defining a limited set of coded signals (710), defining an associated set of messages and commands (720), identifying one of the messages or commands for transmission (730), and transmitting the coded signal (740). In additional embodiments, method 700 may also include one or more of: receiving one of the limited set of coded signal (750), and identifying one of the associated messages or commands (760).

These procedures can be performed in any order or combination, with or without other acoustic communication processes as described herein. For example, these procedures can be performed by an acoustic data transmission system 100, alone or in combination with one or more process steps according to method 460 of FIG. 4 and method 560 of FIG. 5, above.

Depending on application, the coded signals can be defined (710) so each of the coded signals is selected for low cross-correlation with other coded signals in the limited set. For example, the coded signals may be defined as $2^N+1$ binary sequences, where N is a positive integer and each of the binary sequences has a period of at least $2^N-1$ or greater, for example Gold codes or other binary, hexadecimal, octal, or decimal signal codes with suitable cross-correlation properties, as described herein.

More generally, the length of the coding sequence depends on application, and may be an important design consideration since the length tends to improve code identification and transmission accuracy, and to increase the number of available codes, but it also increases the transmission length, which may be undesirable in some applications. As a result, the most suitable transmission length and coding parameters may not be known or obvious in advance, but may instead be selected based on a particular transmission medium, location, desired range, and noise limits.

Depending on these and other environmental factors including the acoustic medium, noise level, and geography, as well as system design considerations like carrier frequency, directionality and vehicle mount, a suitable representative parameter N may be five or less, yielding 33 or fewer distinct coded signal sequences. Alternatively, N may be six or less, yielding 65 or fewer distinct coded signals, or N may be four or less, yielding 17 or fewer distinct coded signals. In particular embodiments, N may be three, two, or less, yielding nine, five, or fewer distinct coded signals.

In defining a set of messages and commands (720), each communication can be associated with a selected one of the coded signals. After identifying one of the messages or commands for transmission (730), the coded signal that is transmitted (740) can be the coded signal associated with the identified message or command. For example, the messages and commands can be mapped one-to-one onto the coded signals. Alternatively, there may be fewer messages and commands than coded signals, so that some coded signals are not associated with commands, and recognizable as noise or interference. Alternatively, some of the messages or commands can be associated with sequences of the coded signals, for example with pairs or triplets of successive signals, or with other code sequences.

The coded signal is can be transmitted (740) via an acoustic medium, using an acoustic transducer. For example, the coded signal can be transmitted by modulating the phase of an acoustic carrier frequency propagating through the acoustic medium. Depending on application, modulating the phase of the acoustic carrier frequency can be performed to transmit the selected coded signal by phase shift keying (PSK), for example binary phase shift keying (BPSK), differential phase shift keying (DPSK), or differential binary phase shift keying (DBPSK).

The acoustic transducer can also be adapted for receiving signals via the acoustic medium (750), for example one of the defined set of coded signal. One of the messages or commands associated with the received coded signal can then be identified (760).

Once identified, individual messages and commands can be acted upon. In some examples, the identified message or command can include a recode command, and, in response, the selected set of messages and commands can be redefined. For example, each of the messages and commands in the set can be associated with a different one of the coded signals, in order to reduce the capability of another party to intercept and decode the messages, or to interfere with the communications. Alternatively new messages or commands can be added to the set, for example to increase the available communications for a given mission or task, without changing the limited set of coded signals associated with the new commands.

EXAMPLES

In various examples and embodiments, an acoustic communication system comprises an acoustic transducer adapted for communicating signals via a subsurface acoustic medium, and a controller in communication with the acoustic transducer. For example, the controller can include a signal programmer adapted for defining a limited set of coded signals, where each of the coded signals is selected for low cross-correlation with other coded signals in the limited set.

A signal encoder can be adapted for defining a set of messages, where each message is associated with a selected one of the coded signals in the limited set. An interface can be provided for identifying one of the messages for transmission; e.g., where the acoustic transducer is configured to transmit the coded signal associated with the identified message via the subsurface acoustic medium.

In any of these examples and embodiments, memory can be provided in communication with the controller, and configured for storing a mapping of the set of messages onto the limited set of coded signals. For example, the mapping may be one-to-one, or one-to-one and onto, or another mapping can be provided. The acoustic transducer can be configured for receiving the limited set of coded signals via the subsurface acoustic medium; e.g., where the controller is configured for identifying the selected one of the messages associated each of the coded signals that are received, using the mapping.

In any of these examples and embodiments, the limited set of coded signals may be defined as a binary sequence. For example, the limited set of coded signals may define $2^N+1$ or fewer such binary sequences. The period of each of the binary sequences may be $2^N-1$ or more, and N can be a positive integer. N may be limited based on a number of the limited set of coded signals designated for transmission during a particular task or mission; e.g. N may be limited to be ten or less, eight or less or five or less, based on the number of the limited set of coded signals designated for transmission during the task or mission. An absolute cross-correlation between any of the coded signals in the limited set may be less than or equal to $2^{(N+2)/2}$.

In any of these examples and embodiments, a transmit/receive switch can be provided in communication with the acoustic transducer; e.g., with a signal generator connected to the transmit/receive switch via a power amplifier and a signal modulator connected with the signal generator and the encoder. For example, the encoder can be adapted to encode the coded signal associated with the identified message. The signal modulator can be adapted to modulate the encoded signal. The signal generator and power amplifier can be adapted to amplify the modulated signal for transmission by the acoustic transducer, responsive to operation of the transmit/receive switch.

In any of these examples and embodiments, one or more of a receiver, a demodulator, a decoder and a correlator can be connected with the acoustic transducer and the encoder. For example, the receiver can be adapted to receive one or more of the coded signals from the acoustic transducer. The demodulator can be adapted for demodulating the received signals. The encoder and correlator can adapted for decoding and correlating the demodulated signals with one of the messages, based on cross-correlation with the associated coded signal.

In any of these examples and embodiments, the signal controller can be configured for determining a speed of sound in the subsurface acoustic medium, for example by sensing a pressure and temperature of the water medium and determining the speed of sound based on the pressure and temperature, or by communicating location data with another such acoustic communication systems, and determining the speed of sound based on the location data and a time delay associated with transmission and reception of location data.

The signal controller can also be configured to perform range and bearing measurements for the received signal, responsive to the determined speed of sound. For example, the range may be based on a strength of the received signal and the directional information may be obtained from a four-quadrant acoustic transducer signal; e.g. using the quadrant signals to triangulate or otherwise determine the bearing along which the signal was transmitted. Range and bearing information can also be obtained by communicating one or more of the coded signals (or other data such as a ping signal) with another acoustic communication system, and measuring a time delay for transmission and reception of the communicated signal. Depending on application, the signal controller can also be configured to determine a probability of intercept for the coded signal associated with the identified message, responsive to the range and bearing measurements. For example, the probability of intercept can be determined by comparing the range and bearing measurements to range and bearing data for another known location, for example the range and bearing measurements for another acoustic receiver or transducer know to be adapted for receiving any one or more of the coded signals.

In any of these examples and embodiments, the message identified for transmission can comprise a recode command; e.g., where the controller is adapted for redefining the limited set of coded signals in response to the recode command. At least one of the messages in the set may be associated with a different one of the coded signals, where the different coded signal was associated with another of the messages in the set prior to transmission of the recode command. At least one new message can be associated with a selected one of the coded signals, where the new message was not associated with any of the coded signals prior to transmission of the recode command.

In any of these examples and embodiments, the acoustic transducer can be adapted to transmit the coded signal by modulating a phase of an acoustic carrier frequency propagating through the subsurface acoustic medium. For example, the acoustic transducer may be adapted to transmit the coded signal by phase shift keying (PSK), binary phase shift keying (BPSK), or differential phase shift keying (DPSK).

In various method and process examples and embodiments, the method for acoustic communications comprises defining a limited set of coded signals, where each of the coded signals being selected for low cross-correlation with other coded signals in the limited set. The method may further comprise defining a set of messages, where each message is associated with a selected one of the coded signals in the limited set. The method may further comprise identifying one of the messages for transmission and transmitting the coded signal associated with the identified message, via a subsurface acoustic medium.

In any of these examples and embodiments, defining the set or messages may comprise mapping the set of messages onto the limited set of coded signals and storing the mapping in memory. The identified message may comprise a recode command and further comprise redefining the mapping in response to the recode command. For example, redefining the mapping can comprise mapping at least one of the messages in the set to a different one of the coded signals, where the different coded signal was associated with another of the message in the set prior to the remapping. In some examples, redefining the mapping comprises mapping at least one new message onto a selected one of the coded signals, where the new message was not associated with any of the coded signals prior to the remapping.

In any of these examples and embodiments, transmitting the coded signal via the subsurface acoustic medium may comprise modulating a phase of an acoustic carrier frequency propagating through the subsurface acoustic medium. For example, modulating the phase of the acoustic carrier frequency may comprise transmitting the coded signal by phase shift keying (PSK), binary phase shift keying (BPSK) or differential phase shift keying (DPSK).

In any of these examples and embodiments, defining the limited set of coded signals comprises defining each of the coded signals as a binary sequence, where the limited set of coded signals may define 2N+1 or fewer such binary sequences. Each of the binary sequences may have a period of 2N−1 or more and N can be a positive integer. In some examples, the method may limit N based on a number of the different coded sequences designated for transmission during a particular task or mission.

Any of these examples and embodiments can include one or more of encoding the coded signal associated with the identified message, modulating the encoded signal, and amplifying the modulated signal for transmission by the acoustic transducer. Any of these examples and embodiments may also include one or more of receiving one or more of the coded signals from the acoustic transducer, demodulating the one or more received signals, and decoding and correlating the demodulated signals with one of the messages, based on a cross-correlation with the associated coded signal.

Any of these examples and embodiments can include determining a speed of sound in the subsurface acoustic medium; e.g., as described above using environmental sensors or by data transmission with another acoustic transducer at a known distance. Range and bearing measurements can also be performed for the received signal responsive to the determined speed of sound; e.g., in combination with ranging information based on the received signal strength and bearing information based on directional information from the acoustic transducer. A probability of intercept for the coded signal associated with the identified message can also be determined; e.g., responsive to comparing the range and bearing measurements with known range and bearing information for other acoustic transducers adapted for receiving, demodulating and decoding one or more of the coded signals.

Each of these method and process embodiments may be practiced independently or in any combination, and further in any combination with the various system embodiments above.

In apparatus examples and embodiments, a subsurface craft can comprise a controller in communication with an acoustic transducer, where the acoustic transducer may be configured to communicate with another submersible craft. For example, the craft may include a hull and propulsion system adapted for navigation through a subsurface acoustic medium, where the acoustic transducer is deployed with the hull.

The acoustic transducer can be configured for communicating signals via the acoustic medium, for example using a controller in communication with the acoustic transducer with a signal programmer adapted for defining a limited set of coded signals, and a signal encoder adapted for defining a set of messages. Each of the coded signals may be selected for low cross-correlation with other coded signals in the limited set, and each message can be associated with a selected one of the coded signals. A graphical user interface or other hardware or software interface can be provided for identifying one or more of the messages for transmission; e.g., where the acoustic transducer is configured to transmit the coded signal associated with the identified message to the other submersible craft.

Each of these craft and apparatus embodiments can be practiced individually or in any combination, and further in any combination with the various system and method embodiments above.

This disclosure is made with reference to exemplary embodiments. It is understood that changes can be made and equivalents may be substituted to adapt these teachings to different problems and applications, while remaining within the spirit and scope of the invention as claimed. The invention is not limited to the particular examples that are described, and encompasses all embodiments within the scope of the appended claims.

The invention claimed is:

1. An acoustic communication system comprising:
   an acoustic transducer adapted for communicating signals via a subsurface acoustic medium;
   a controller in communication with the acoustic transducer, the controller comprising:
   a signal programmer adapted for defining a limited set of coded signals, each of the coded signals selected for low cross-correlation with other coded signals in the limited set, wherein:
   the limited set of coded signals are each defined as a binary sequence; and
   the limited set of coded signals defines $2^N+1$ or fewer such binary sequences, wherein:
   N is a positive integer; and
   each of the binary sequences has a period of $2^N-1$ or more;
   a signal encoder adapted for defining a set of messages, wherein each message is associated with a selected one of the coded signals in the limited set; and
   an interface for identifying one of the messages for transmission; and
   wherein the acoustic transducer is configured to transmit the coded signal associated with the identified message via the subsurface acoustic medium.

2. The system of claim 1, further comprising memory in communication with the controller and configured for storing a mapping of the set of messages onto the limited set of coded signals.

3. The system of claim 2, wherein the acoustic transducer is configured for receiving the limited set of coded signals via the subsurface acoustic medium, and wherein the controller is configured for identifying the selected one of the messages associated each of the coded signals that are received, using the mapping.

4. The system of claim 3, wherein N is limited to ten or less, eight or less or five or less, based on a number of the limited set of coded signals designated for transmission during a particular task or mission on which the system is deployed.

5. The system of claim 3, wherein an absolute cross-correlation between any of the coded signals in the limited set is less than or equal to $2^{(N+2)/2}$.

6. The system of claim 1, further comprising a transmit/receive switch in communication with the acoustic transducer, a signal generator connected to the transmit/receive switch via a power amplifier, and a signal modulator connected with the signal generator and the encoder, wherein the encoder is adapted to encode the coded signal associated with the identified message, the signal modulator is adapted to modulate the encoded signal, and the signal generator and power amplifier are adapted to amplify the modulated signal for transmission by the acoustic transducer, responsive to operation of the transmit/receive switch.

7. The system of claim 1, further comprising a receiver, a demodulator, a decoder and a correlator connected with the acoustic transducer and the encoder, wherein the receiver is adapted to receive one or more of the coded signals from the acoustic transducer, the demodulator is adapted for demodulating the one or more received signals, and the decoder and correlator are adapted for decoding and correlating the demodulated signals with one of the messages, based on cross-correlation with the associated coded signal.

8. The system of claim 7, wherein the signal controller is configured for determining a speed of sound in the subsurface acoustic medium and for further configured for one or more of:
   performing range and bearing measurements for the received signal responsive to the determined speed of sound; and
   determining a probability of intercept for the coded signal associated with the identified message responsive to the range and bearing measurements.

9. The system of claim 1, wherein the message identified for transmission comprises a recode command and the controller is adapted for redefining the limited set of coded signals in response thereto, wherein:
   at least one of the messages in the set is associated with a different one of the coded signals, wherein the different coded signal was associated with another of the messages in the set prior to transmission of the recode command; or
   at least one new message is associated with a selected one of the coded signals, wherein the new message was not associated with any of the coded signals prior to transmission of the recode command.

10. The system of claim 1, wherein the acoustic transducer is adapted to transmit the coded signal by modulating a phase of an acoustic carrier frequency propagating through the subsurface acoustic medium using phase shift keying (PSK), binary phase shift keying (BPSK), or differential phase shift keying (DPSK).

11. A method for acoustic communications, the method comprising:
   defining a limited set of coded signals, each of the coded signals being selected for low cross-correlation with other coded signals in the limited set, wherein defining the limited set of coded signals comprises defining each of the coded signals as a binary sequence, wherein the limited set of coded signals defines $2^N+1$ or fewer such binary sequences, wherein:
  N is a positive integer; and
  each of the binary sequences has a period of $2^N-1$ or more;
defining a set of messages, wherein each message is associated with a selected one of the coded signals in the limited set;
identifying one of the messages for transmission; and
transmitting the coded signal associated with the identified message, via a subsurface acoustic medium.

12. The method of claim 11, wherein defining the set or messages comprises mapping the set of messages onto the limited set of coded signals and storing the mapping in memory.

13. The method of claim 11, wherein the identified message comprises a recode command and further comprising redefining the mapping in response to the recode command, wherein redefining the mapping comprises:
  remapping at least one of the messages in the set to a different one of the coded signals, wherein the different coded signal was associated with another of the message in the set prior to redefining the remapping; or
  remapping at least one new message onto a selected one of the coded signals, wherein the new message was not associated with any of the coded signals prior to redefining the remapping.

14. The method of claim 11, wherein transmitting the coded signal via the subsurface acoustic medium comprises modulating a phase of an acoustic carrier frequency propagating through the subsurface acoustic medium using phase shift keying (PSK), binary phase shift keying (BPSK) or differential phase shift keying (DPSK).

15. The method of claim 11, further comprising limiting N to ten or less, eight or less or five or less, based on a number of the different coded sequences designated for transmission during a particular task or mission.

16. The method of claim 11, further comprising:
  encoding the coded signal associated with the identified message, modulating the encoded signal, and amplifying the modulated signal for transmission by the acoustic transducer; or
  receiving one or more of the coded signals from the acoustic transducer, demodulating the one or more received signals, and decoding and correlating the demodulated signals with one of the messages, based on a cross-correlation with the associated coded signal.

17. The method of claim 11, further comprising determining a speed of sound in the subsurface acoustic medium and one or more of:
  performing range and bearing measurements for the received signal responsive to the determined speed of sound; and
  determining a probability of intercept for the coded signal associated with the identified message, responsive to the range and bearing measurements.

18. A subsurface craft comprising:
  a hull and propulsion system adapted for navigation through a subsurface acoustic medium;
  an acoustic transducer deployed with the hull, the acoustic transducer configured for communicating signals via the acoustic medium;
  a controller in communication with the acoustic transducer, the controller comprising:
    a signal programmer adapted for defining a limited set of coded signals, each of the coded signals selected for low cross-correlation with other coded signals in the limited set; and
    a signal encoder adapted for defining a set of messages, wherein each message is associated with a selected one of the coded signals in the limited set; and
  an interface for identifying one of the messages for transmission, wherein the acoustic transducer is configured to transmit the coded signal associated with the identified message via the subsurface acoustic medium.

* * * * *